United States Patent Office 3,726,695
Patented Apr. 10, 1973

3,726,695
GLASS-CERAMICS CONTAINING MULLITE
George H. Beall, Big Flats, and Hermann L. Rittler, Horseheads, N.Y., assignors to Corning Glass Works, Corning, N.Y.
Filed Dec. 28, 1971, Ser. No. 212,985
Int. Cl. C03c 3/22
U.S. Cl. 106—39 DV    2 Claims

ABSTRACT OF THE DISCLOSURE

The instant invention relates to the production of glass-ceramic articles having compositions within the $Cs_2O$—$Al_2O_3$—$SiO_2$ field wherein the crystal phase present therein consists essentially of mullite ($3Al_2O_3 \cdot 2SiO_2$). Such articles exhibit good dimensional stability at temperatures up to about 1250° C. and range from translucent to transparent in appearance. This combination of properties has rendered these products exceptionally useful for high temperature lamp envelopes.

---

The production of glass-ceramic articles is founded upon the crystallization in situ of glass articles. The process involves three basic steps. First, a glass-forming batch normally containing a nucleating agent is melted; second, this melt is simultaneously cooled to a glass and an article of a desired configuration shaped therefrom; and, third, this glass article is thereafter subjected to a heat treatment which is calculated to initially cause the development of nuclei in the glass that act as sites for the subsequent growth of crystals thereon as the heat treatment is continued.

Inasmuch as this crystallization has resulted from the essentially simultaneous growth of crystals upon submicroscopic nuclei dispersed throughout a glass body, a glass-ceramic article is comprised of relatively uniformly fine-grained crystals substantially homogeneously dispersed throughout a residual glassy matrix, the crystal phase normally constituting the predominant proportion of the article. Since the body of a glass-ceramic article is partially crystalline, the article takes on chemical and physical characteristics which are normally quite different from those demonstrated by the parent glass and which, frequently, are more nearly akin to those exhibited by the crystals, themselves. Finally, the very high crystallinity of the glass-ceramic article results in a residual glassy matrix having a far different chemical composition from that of the original glass inasmuch as the components making up the crystal phase will have been removed therefrom.

Inasmuch as the glass-ceramic article is crystallized in situ from a glass article, the conventional glass-forming methods such as blowing, casting, drawing, pressing, rolling, etc., can be employed to produce the shapes desired. Furthermore, since the glass-ceramic article is derived from a glass body, it is free from voids and is non-porous.

A fuller discussion of the crystallization mechanism and the practical manufacturing considerations involved in the production of glass-ceramic articles are set forth in U.S. Pat. No. 2,920,971 and reference is hereby made to that patent for such information. For example, it will be readily recognized from that disclosure that the crystal phases developed in the glass-ceramic article are dependent upon the composition of the original glass article and the particular heat treatment to which that glass article is subjected.

U.S. Pat. No. 3,236,662 is concerned with the manufacture of glass-ceramic articles wherein mullite ($3Al_2O_3 \cdot 2SiO_2$)

constitutes the predominant crystal phase. Such articles consisted essentially, by weight, of 35–70% $Al_2O_3$, 10–64% $SiO_2$, and at least one modifying oxide from a group including 4–15% $Cs_2O$. The modifying oxide served two functions: (1) to assure the production of a stable parent glass; and (2) to inhibit the formation of cristobalite during the crystallization in situ of the parent glass. At least 35% $Al_2O_3$ was demanded to secure a substantial amount of mullite crystallization and the maximum amount of modifying oxide must not be exceeded lest crystals be developed which are incompatible with mullite. The articles produced were white and opaque with crystal contents in excess of 25% by weight and the crystals, themselves, being smaller than 30 microns in diameter.

The instant invention is founded upon the discovery that quite refractory, translucent-to-transparent glass-ceramic articles of relatively high crystallinity, i.e., containing at least 25% by volume crystals, wherein the crystals consist essentially of mullite, can be formed through the crystallization in situ of glass articles in the $Cs_2O$—$Al_2O_3$—$SiO_2$ composition field where the $Al_2O_3$ content is less than 35% by weight. As was observed in the aforementioned Pat. No. 3,236,662, at least 4% by weight $Cs_2O$ is required as a modifying oxide and the present inventors have learned that the presence of more than 15% leads to the production of pollucite crystals with the consequent development of an opaque rather than a translucent or transparent body. $Al_2O_3$ contents of 35% by weight and higher also lead to the development of opaque articles. However, at least about 15% $Al_2O_3$ is necessary to secure the desired mullite crystallinity. Therefore, the base glasses suitable in the instant invention consist essentially, by weight on the oxide basis, of about:

$Cs_2O > 4\%$ but $< 15\%$
$Al_2O_3 > 15\%$ but $< 35\%$
$SiO_2 > 35\%$ but $< 80\%$ The above-recited glasses are self-nucleating, i.e., no nucleating agent per se is required to initiate the subsequent growth of relatively-uniform, fine-grained crystals. Hence, it is believed that the initial submicroscopic nuclei which are formed are actually mullite and that these nuclei simply grow into the desired crystals. X-ray diffraction analyses of the crystallized products have indicated mullite to be the predominant and, frequently, the only crystal phase present.

The appended photograph is a replica electron micrograph illustrating the microstructure of the products of this invention. The white bar at the bottom of the photograph represents one micron in length.

In broadest terms, the instant invention involves melting a batch for a glass having a composition encompassed within the $Cs_2O$—$Al_2O_3$—$SiO_2$ field set out above, simultaneously cooling the melt at least below the transformation range thereof and forming a glass article of a desired configuration therefrom, and thereafter heating that glass article to a temperature between about 1100°–1300° C. for a period of time of sufficient length to cause the glass to crystallize in situ. (The transformation range has been defined as the temperature at which a liquid melt is considered to have been transformed into an amorphous solid, that temperature generally being deemed to lie between the strain point and the annealing point of a glass.)

The batch ingredients utilized may be any materials, either oxides or other compounds, which, upon being melted together, are converted to the desired oxide composition in the proper proportions. However, inasmuch as the naturally-occurring mineral, pollucite (classical formula $Cs_2O \cdot Al_2O_3 \cdot 4SiO_2$), is commercially available, its use as a high ingredient is economically desirable since pure cesium compounds are relatively expensive.

The crystallization phenomenon is a time and temperature dependent reaction. Therefore, where temperatures within the upper extremes of the crystallization range are employed, brief periods of exposure will be satisfactory to secure the desired highly crystalline body. In contrast, proportionately longer exposure periods will be required to achieve a similar body when the crystallization temperatures utilized are in the cooler extreme of the operable range. For example, a dwell period of one-half hour or even less may be effective with temperatures in the hotter extreme of the crystallization range, whereas exposure periods of as long as 48 hours may be necessary to secure the desired crystalline final product where temperatures within the cooler portion of the crystallization range are employed. Longer periods of heat treatment can be successfully utilized but such are not economically attractive and, furthermore, such treatments can lead to crystal growth, particularly where temperatures within the upper extreme of the crystallization are employed, which can result in increased translucency and, after very extended heat treatments, in an opaque body. Therefore, where transparent or only slightly translucent articles are desired, dwell periods not exceeding about 16 hours in the cooler extreme and not exceeding about 6 hours in the upper extreme of the crystallization range have been found very satisfactory.

The preferred heat treatment procedure comprises a two-step schedule. In this practice, the parent glass article is first heated to a temperature somewhat above the transformation range, e.g., about 800°–1100° C., and maintained within that field of temperature for a time of sufficient length to provide adequate nucleation and initiate incipient crystal development. Adequate nucleation assures the desired fine-grained crystallization. Thereafter, the nucleated body is heated to a temperature between about 1100°–1300° C. and maintained within that range of temperatures for a time of sufficient length to generate substantial crystal growth. Commonly, a nucleation treatment of about 2–6 hours has been employed followed by a period of about 1–8 hours for the growth of crystals.

Inasmuch as the mechanism of crystallization is both time and temperature dependent, wide variations in the actual means utilized are feasible. Several of the possible variations are set out below.

As a first embodiment, after the batch has been melted and the melt quenched to a temperature below the transformation range of the melt and an article of glass formed therefrom, that glass article can thereafter be cooled to room temperature to allow the ready visual inspection of glass quality prior to commencing the crystallization heat treating schedule. Nevertheless, in those instances where production speed and fuel economies are deemed to be of vital importance, the above-described melt may merely be cooled and shaped into a glass article at some temperature immediately below the transformation range thereof and then subjected at once to the crystallization heat treatment.

In a possible second embodiment, the preferred two-step heat treatment practice is replaced with a single step. Thus, a very satisfactorily crystallized article can be secured where the parent glass article is simply heated from room temperature or some other temperature below the transformation range to a temperature within the 1100°–1300° C. field and maintained within that field for a sufficient period of time to develop the desired crystallinity.

In both of the embodiments, it must be appreciated that no single dwell temperature as such is demanded to assure the desirable fine-grained crystallization. Rather, the glass article can be subjected at will to various temperatures within the operable crystallization range.

In a third embodiment, no exposure period at any one temperature need be employed. Thus, where the rate of heating the parent glass article above the transformation range thereof is relatively slow and the final crystallization temperature employed is relatively high, no specific dwell period as such at any particular temperature is necessary.

One factor which must be kept in mind regarding the crystallization process is the rate at which the initial glass article is heated above the transformation range thereof. Hence, caution ought to be exercised such that this rate is not so rapid that an adequate growth of crystals to support the article will not have the opportunity to occur and the article will, consequently, deform and slump. Therefore, whereas heating rates of 10° C./minute and higher can be utilized, especially where some auxiliary means of physical support for the original glass articles are provided to minimize deformation, the preferred practice employs heating rates not exceeding about 5° C./minute.

The above-delineated proportions of $Cs_2O$, $Al_2O_3$, and $SiO_2$ have been determined to be critical in insuring the production of uniformly fine-grained, translucent-to-transparent glass-ceramic articles wherein the crystal phase consists essentially of mullite. Small amounts of the other alkali metal oxides may be included to aid in stabilizing the glass but the total of all such additions will preferably not exceed about 10% by weight, as their inclusion adversely affects the refractoriness of the crystallized product.

Minor amounts of $B_2O_3$ and $P_2O_5$ can function as melting aids but, here again, their addition results in a fluxing action which is deleterious to the refractoriness of the final article. Therefore, the most preferred articles will contain no more than about 5% total of these ingredients. The alkaline earth metal oxides may also be present to aid in melting and forming the glass and do not appear to have the same severely adverse effect upon the refractoriness of the final product as do the alkali metal oxides, $B_2O_5$ and $P_2O_5$. Nevertheless, it is preferred that the total of alkaline earth metal oxides not exceed about 10% by weight.

Finally, small amounts of such conventional nucleating agents as $TiO_2$, $SnO_2$, and $ZrO_2$ can be included in the glass-forming batch but with little, if any, substantive effect with regard to nucleating action. Furthermore, $TiO_2$ and $SnO_2$, in particular, behave as fluxes and, in so doing, adversely affect the final refractoriness of the crystallized products. Also, the indiscriminate employment of these nucleating agents hazards the growth of crystal phases other than mullite which will not be compatible therewith. For example, the inclusion of these latter two agents can lead to the development of cristobalite which results in the body cracking when exposed to high temperature applications. Therefore, it is preferred that the total of these two components be less than about 5%. $ZrO_2$ appears to demonstrate less of these deleterious effects and seems to behave more like an inert refractory filler. Nevertheless, the presence of substantial amounts of crystallized $ZrO_2$ in the final products increases the degree of translucency therein. Hence, it is preferred that the $ZrO_2$ content be held below about 15%.

In summary, the greatest dimensional stability at high temperatures and the best transparency or least translucency is attained when the original glass compositions consist essentially of $Cs_2O$, $Al_2O_3$, and $SiO_2$. However, where it is desired to modify such physical properties as glass melting and forming characteristics, the coefficient of thermal expansion and/or the mechanical strength of the crystallized product, etc., minor amounts of the above-described or other optional constituents may be added. Nevertheless, the total of all such additions will not exceed 15% by weight and, preferably, will not exceed about 10% by weight. The preferred glass compositions, based upon melting and forming behavior, as well as the highest degree of crystallinity, consist essentially, by weight on the oxide basis, of about 7–12% $Cs_2O$, 20–30% $Al_2O_3$, and 50–75% $SiO_2$.

Table I reports compositions, expressed in weight percent on the oxide basis, of thermally crystallizable glass which, when subjected to the heat treatment procedure delineated above as operable in this invention, were crystallized in situ to uniformly-crystalline, translucent-to-transparent glass-ceramic bodies. The batch ingredients for each example were dry ball-milled together for one hour to aid in obtaining a homogeneous melt. Thereafter, the batches were placed in closed rhodium crucibles and melted for about six hours in an electrically-fired furnace operating at temperatures of about 1850°–2000° C. The resulting melts were poured onto steel plates to form patties which were immediately transferred to an annealer operating at 800° C. These patties were essentially colorless and transparent when removed from the annealer. The viscosity of the melts at the liquidi thereof varied between about 2000–50,000 poises with the liquidus temperatures ranging between about 1500°–1850° C.

The microstructure of the crystallized patties comprises a crystalline body, viz, greater than 25% and, frequently, greater than 50% by volume crystalline, wherein the crystals, themselves, are substantially all smaller than 1 micron in diameter with the majority being less than 0.5 micron in diameter.

These features are demonstrated in the appended photograph which comprises a replica electron micrograph illustrating the microstructure of Example 15. Prior to examining the body under the electron microscope, the surface thereof was first etched for one minute in a ½% aqueous solution of HF. The residual glass was removed thereby resulting in the mullite and zirconia crystals standing out in bold relief. The size of the crystals can be compared with the white bar near the bottom of the photograph which represents one micron in linear dimension. The zirconia crystals are the very small, approximately round, crystals.

That the articles of this invention exhibit relatively high refractoriness is evidenced through the measurement

TABLE I

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $SiO_2$ | 62.14 | 61.32 | 61.88 | 62.07 | 66.12 | 59.99 | 55.08 | 56.06 | 62.07 | 55.95 | 60.01 | 63.25 | 65.16 | 70.00 | 39.0 |
| $Al_2O_3$ | 33.74 | 30.56 | 23.13 | 33.93 | 25.10 | 25.08 | 29.99 | 31.99 | 33.93 | 32.07 | 29.03 | 24.76 | 23.86 | 20.00 | 34.0 |
| $Cs_2O$ | 4.12 | 8.12 | 8.19 | 4.00 | 8.78 | 7.97 | 7.97 | 11.95 | 4.00 | 11.98 | 10.96 | 11.99 | 10.98 | 8.00 | 12.0 |
| $B_2O_3$ | | | | | | | | | | | | | | 2.00 | |
| $ZrO_2$ | | | 6.80 | | | 6.96 | 6.96 | | | | | | | | 15.0 |

After annealing and visual inspection for glass quality, the patties were placed in an electrically-fired furnace and exposed to the heat treatment schedules recorded in Table II. In each of said schedules, the temperatures within the furnace were elevated at a rate of about 5° C./minute to each of the dwell temperatures reported. At the conclusion of each crystallization treatment, the electric current to the furnace was cut off and the crystallized patties merely left within to cool to room temperature. This procedure has been termed "cooling at furnace rate" and was employed for two reasons: first, as a matter of convenience; and, second, to insure against possible cracking or breakage from abrupt thermal shock. This rate of cooling has been estimated to average about 3°–5° C./minute.

Table II also records a visual description of the crystallized body and the crystal phases identified in the heat treated bodies through X-ray diffraction analysis.

TABLE II

| Example No. | Heat treatment | Visual description | Crystal phases |
|---|---|---|---|
| 1 | 1,000° C. for 2 hrs., 1,250° C. for 4 hrs. | Transparent | Mullite. |
| 2 | 900° C. for 2 hrs., 1,150° C. for 6 hrs. | do | Do. |
| 3 | 800° C. for 4 hrs., 1,200° C. for 6 hrs. | do | Mullite and cubic zirconia. |
| 4 | 1,000° C. for 2 hrs., 1,300° C. for 2 hrs. | Translucent | Mullite. |
| 5 | 900° C. for 4 hrs., 1,250° C. for 4 hrs. | Transparent | Do. |
| 6 | 1,000° C. for 2 hrs., 1,200° C. for 6 hrs. | Translucent | Mullite and cubic zirconia. |
| 7 | 1,000° C. for 2 hrs., 1,250° C. for 4 hrs. | do | Do. |
| 8 | 800° C. for 6 hrs., 1,200° C. for 6 hrs. | Transparent | Mullite. |
| 9 | 900° C. for 4 hrs., 1,300° C. for 4 hrs. | Translucent | Do. |
| 10 | 1,000° C. for 4 hrs., 1,200° C. for 6 hrs. | Transparent | Do. |
| 11 | 1,050° C. for 4 hrs., 1,250° C. for 4 hrs. | do | Do. |
| 12 | 1,000° C. for 4 hrs., 1,200° C. for 6 hrs. | do | Do. |
| 13 | 900° C. for 4 hrs., 1,150° C. for 8 hrs. | do | Do. |
| 14 | 1,000° C. for 2 hrs., 1,200° C. for 6 hrs. | Translucent | Do. |
| 15 | 1,000° C. for 4 hrs., 1,250° C. for 4 hrs. | do | Mullite and cubic zirconia. | of annealing points between about 850°–1000° C. and of strain points between about 800°–950° C. Example 15 has maintained its transparency after 24 hours of soaking heat at 1250° C. This high refractoriness is due not only to the presence of mullite crystals in the body but also to the fact that the residual glass is a highly siliceous cesium silicate. The cesium ion is very large which results in a glass having a much greater viscosity at a particular temperature than the same glass with a like molar content of a smaller alkali metal ion such as sodium or potassium substituted for cesium. Therefore, this exceptional viscosity behavior permits articles of the present invention to exhibit good dimensional stability at temperatures up to 300° C. higher than the annealing points thereof.

In the context of this application, translucency is defined as exhibiting visible transmission through a ¼″ cross section of at least 30% as measured spectrophotometrically.

This application is being filed concurrently with a second application by the same inventors, viz, Ser. No. 212,952 which discloses the production of opaque, extremely refractory glass-ceramic articles wherein the predominant crystal phase is pollucite, and with a third application filed in the names of L. M. Adelsberg, M. C. Carson, R. B. Forker, and H. H. Rittler, viz, Ser. No. 213,223, which is directed toward the manufacture of molds for casting metals wherein the mullite-containing materials of the instant invention can be utilized.

We claim:

1. A translucent-to-transparent glass-ceramic article which consists essentially, by weight on the oxide basis, of about
$Cs_2O>4\%$ but $<15\%$,
$Al_2O_3>15\%$ but $<35\%$, and
$SiO_2>35\%$ but $<80\%$,
the sum of the $Cs_2O$, $Al_2O_3$, and $SiO_2$ contents constituting at least 85% by weight of the total composition, and is composed of a multiplicity of fine-grained crystals substantially homogeneously dispersed within a glassy matrix, said crystals comprising at least 25% by volume of said article and consisting essentially of mullite.

2. A translucent-to-transparent glass-ceramic article according to claim 1 consisting essentially, by weight on the oxide basis, of about 7–12% $Cs_2O$, 20–30% $Al_2O_3$, and 50–75% $SiO_2$.

References Cited

UNITED STATES PATENTS

| | | | |
|---|---|---|---|
| 3,236,662 | 2/1966 | MacDowell | 106—52 X |
| 3,422,025 | 1/1969 | Snitzer et al. | 106—52 |
| 3,282,770 | 11/1966 | Stookey et al. | 106—39 DV |
| 3,232,771 | 2/1966 | Pearce | 106—38.35 |

HELEN M. McCARTHY, Primary Examiner

U.S. Cl. X.R.

106—52; 65—33; 313—221